Feb. 9, 1954

W. J. JOHNSON 2,668,324

MEANS FOR MAKING CREASELESS, COMPLETELY
FLATTENED, EXTRUDED PLASTIC TUBING
Filed Dec. 29, 1951

WILLARD J. JOHNSON,
INVENTOR.

BY

ATTORNEY

Patented Feb. 9, 1954

2,668,324

UNITED STATES PATENT OFFICE 2,668,324

MEANS FOR MAKING CREASELESS, COMPLETELY FLATTENED, EXTRUDED PLASTIC TUBING

Willard J. Johnson, Midland Park, N. J., assignor of one-third to Louis Danenberg and one-third to Alex Danenberg, Long Island City, N. Y.

Application December 29, 1951, Serial No. 264,118

5 Claims. (Cl. 18—14)

1

The present invention relates to the extrusion and complete flattening of plastic tubing of flexible material which is film-thin. Such tubing is used for example, in packaging and for the making of bags.

The extrusion die may be of a size to extrude such tubing of the required diameter, but usually such tubing is extruded with a thicker wall and of a smaller diameter than is desired, and then expanded to desired size by inflating said tubing near the discharge orifice. At a sufficient distance away from the point of extrusion, such tubing is passed through a pair of rollers which deliver such tubing in completely flattened condition, as a two-ply web.

The principal object of this invention is to provide a novel and improved device which avoids the forming of creases in the plies of the flattened tubing.

Another object hereof is to provide a novel and improved device of the character mentioned which is adjustable for use with tubings of different diameters.

A further object hereof is to provide a novel and improved device for preventing creases from forming as aforesaid, which is simple in construction, reasonably cheap to manufacture, easy to use, adaptable for installation on existing extrusion apparatus, and which is efficient in carrying out the functions for which it is designed.

Other objects and advantages will become apparent as this disclosure proceeds.

In the accompanying drawings forming part of this specification, similar characters of reference indicate corresponding parts in all the views.

Figure 2:
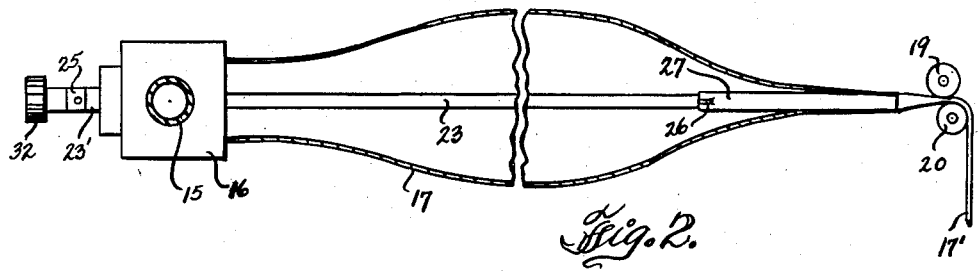
Fig. 2 is a top plan view of Fig. 1.

In the drawings, the numeral 15 designates an extruder from whose die 16 is being extruded the plastic tubing 17. Such tubing is being inflated by air under pressure fed into the tubing at 18. Before the expanded tubing is completely flattened by the rollers 19, 20 between which it passes, it is dealt with by a device 21 or 22 positioned within the running tube in the region of said rollers, as will be explained.

2

The numeral 23 denotes a tube or pipe positioned through the body of the die 16 and secured thereto. This pipe extends centrally longitudinally through the tubing being extruded and also out of the die in the opposite direction as at 23'. A rod 24 is concentrically positioned through said pipe 23 and extends out of both ends of said pipe. Said rod, at each end of the pipe, carries a collar 25 secured thereon, whereby said rod is journalled with respect to said pipe 23. At the end of said pipe which is nearest the rollers 19, 20, are diametrically opposite lugs 26, on each of which is linked an end of an arm 27. These arms are of a shape, that for instance, both together determine a parabola and extend free towards the tube-flattening rollers 19, 20. The numeral 28 is a nut in threaded engagement with the threaded end 24' of the rod 24. This nut has the diametrically opposite lugs 29. Both arms 27, intermediate their ends and similarly positioned, have the lugs 30 respectively. These lugs 30 extend towards each other. The numeral 31 indicates a link. One such link is pivotally connected at its respective ends to one of the lugs 29 and 30, one such link for each arm 27 as shown. The outer end of the rod 24 carries a handle 32 secured thereon. The numeral 33 denotes a tubular packing inside pipe 24. The numeral 34 is a removable cap nut to act as a stop for the nut 28. The arms 27 may be tubular, or of round rod or rounded channel stock, fashioned thin at their free end portions as at 27'. All pivotal connections are on parallel axes which are perpendicular to the axes of the rollers 19, 20. To attain circulation of the air in the extruded tubing by employment of a system set forth in my copending application recently filed, I provide the exhaust pipe 35.

The device 21 is of course at such position where the material of the tubing 17 is in set condition so that the arms 27 effect no enlargement in the dimension of the tubing's diameter. The function of these arms is to flatten the tubing 17 so that it is nearly completely flattened before such tubing enters between the rollers 19, 20 which completely flatten such tubing into a two ply web, in which condition it is delivered as at 17' to any desired device for further handling.

In operation, turning the screw rod 24 by means of the handle 32, in one direction, will cause the arms 27 to spread apart. When such handle is turned in the opposite direction, the arms will move nearer together, because such movements of said screw rod will cause the movement along it of the nut 28. Adjustment is made in any run, that the flattened tube 17 has its body taut in slight degree as it leaves the free ends of the arms 27 to enter between the rollers 19, 20. Said arms of course are smooth and without sharp edges.

Figure 1:
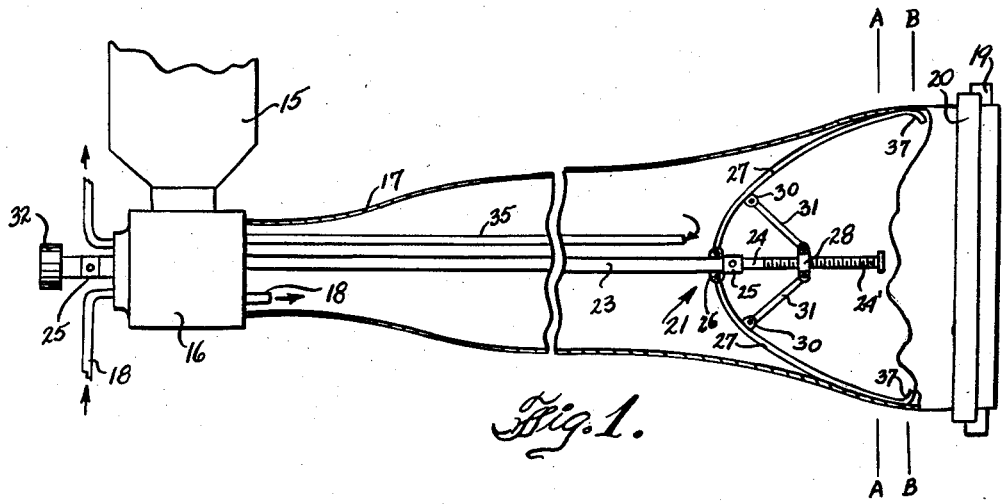
Fig. 1 is a view partly diagrammatic and partly in section, as well and partly fragmentary, showing plastic tubing being extruded and inflated, then dealt with by a device embodying the teachings of this invention and finally passed through flattening rollers for delivery to a wind-up mechanism or to be fed into a machine which will further deal with such tubing.
Figure 5:
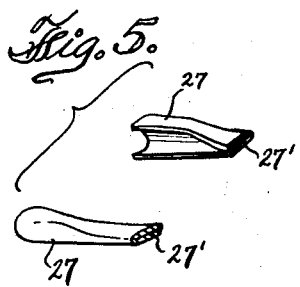
Fig. 5 is a perspective view of portions included between lines A and B in Fig. 1.

It is advisable to have the free ends of said arms turned inward a bit as at 37 so as to avoid cutting the flattened tubing 17. The use of the apparatus shown in Fig. 1 delivers the completely flattened tubing at 17' entirely free of any creases.

At commencement of the run, the arms 27 are adjusted to be close to one another so as to mount the extruded tubing over the device 21 and through the rollers 19, 20. As the run progresses a little, handle 32 is manipulated to spread the arms 27 apart the required distance for proper operation.

Figure 3:
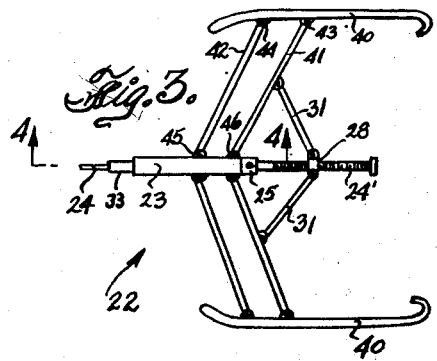
Fig. 3 is a modified form of the crease preventing device shown in the position it would appear if included in the set-up illustrated in Fig. 1.
Figure 4:
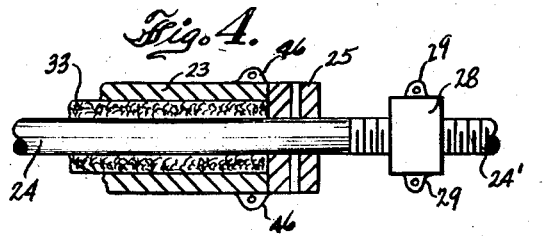
Fig. 4 is a section taken at lines 4—4 in Fig. 3.

As a modification of the pre-flattening device 21, I present the structure illustrated in Fig. 3, where the arms 40 are always in parallel relation with provision to alter the distance between them by turning the knob or handle 32. Each arm 40 is associated with a pair of links 41 and 42. Intermediate the ends of link 41, is pivotally linked an end of a link 31. Points 43, 44, 45 and 46 are pivotal connections determining a parallelogram. The ends of the arms 40 are turned inward. When handle knob 32 is turned so that nut 28 travels towards the right, the arms 40 will come closed to each other. Upon reverse direction of the nut travel, said arms will move further apart.

Although the direction of extrusion is herein shown to be horizontal, it is understood and well known in the art that such direction may be in any straight direction. In fact, many installations extrude vertically where head room permits, thus saving floor space.

It is evident that if a machine is to be used for the making of the tubing into a two-ply web 17' which is to be of one definite width, then the arms 27 may be fixed. However, even in such instance it is best to have adjustable arms, but not mandatory. Adjustability assures tautness of the partially flattened tubing around the arms, at a predetermined degree, to accomplish a creaseless web 17', and of course makes the apparatus adaptable for the manufacture of such web in various widths, depending upon the final size to which the tubing is inflated. If no inflation is used, then it is evident that the web width will depend upon the size of the discharge orifice of the die used. Each die may have its own device 21, or such device may be adapted to be removed and mounted on the particular die 16 associated with the extruder 15.

This invention is capable of numerous forms and various applications without departing from the essential features herein disclosed. It is therefore intended and desired that the specific description herein be deemed illustrative and not restrictive and that the patent shall cover all patentable novelty herein set forth; reference being had to the following claims rather than to the particular embodiments herein disclosed to indicate the scope of this invention.

I claim:

1. In a device of the type including a die having a discharge orifice for extruding therefrom a continuous plastic tubing which is flexible when in set condition, a pair of rollers positioned at a distance from the discharge orifice where such tubing is in set condition, adapted to receive such tubing between them in substantially a central longitudinal plane of such tubing; such plane being taken at the point of extrusion; said rollers being adapted to completely flatten the tubing passed between them into a two-ply web, the improvement consisting of an elongated member extending towards said rollers from substantially the center of said discharge orifice and secured to the die and a tube guiding means including a pair of elongated arms carried movably on said elongated member and extending adjacent said rollers substantially in said plane on opposite sides respectively of said elongated member; the remote longitudinal surfaces of said arms, contacting diametrically opposite, comparatively narrow lanes of the interior surface of said tubing, longitudinally of said tubing, before such tubing enters between the rollers; said arms being of comparatively small thickness adjacent the rollers and there substantially equi-spaced from the axis line of the tubing, a distance slightly less than half of the distance along the rollers along which said tubing contacts said rollers; said tubing when travelling towards the rollers, enveloping said elongated member and said pair of arms, and means for moving said arms towards and away from each other and to hold them in any set position; all movements of said arms, being substantially equal.

2. The improvement as defined in claim 1, wherein the ends of the arms adjacent the rollers, taper towards said rollers in respective planes perpendicular to the mentioned plane.

3. The improvement as defined in claim 1, wherein the elongated member carrying the arms, is a pipe which extends through the die so that an end of the pipe is accessible exterior the plastice tubing and wherein said arm adjustment means comprises an elongated member lying within said pipe, axially rotatable therein, maintained against relative longitudinal movement thereto and extending beyond both ends of said pipe; the end of such inner elongated member which is nearest the rollers, being threaded, a nut in threaded engagement on said threaded end and linkage pivotally connecting said arms and nut whereby on rotation of the threaded member, the nut will travel therealong whereupon the arms will move in opposite directions depending on the direction of rotation of said threaded member.

4. The improvement as defined in claim 1, wherein the elongated member carrying the arms, is a pipe which extends through the die so that an end of the pipe is accessible exterior the plastice tubing and wherein said arm adjustment means comprises an elongated member lying within said pipe, axially rotatable therein and extending beyond both ends of said pipe and means associated with said inner elongated member and said arms for moving said arms in opposite directions upon rotation of said inner elongated member.

5. The improvement as defined in claim 1, wherein the arm adjustment means comprises a second elongated member along the first elongated member which carries the arms; said second elongated member extending through the die so as to be accessible exterior the plastic tubing for movement with respect to the die and means associated with the said second elongated member and the arms whereby on movement of said second elongated member, said arms will move in opposite directions.

WILLARD J. JOHNSON.

References Cited in the file of this patent

UNITED STATES PATENTS

| Number | Name | Date |
| --- | --- | --- |
| 2,559,386 | Bailey | July 3, 1951 |
| 2,631,332 | Reber | Mar. 17, 1953 |